United States Patent Office 3,547,946
Patented Dec. 15, 1970

3,547,946
THIOL AND THIONOTHIOL-PHOSPHORIC AND -PHOSPHONIC ACID ESTERS
Walter Lorenz, Wuppertal-Vohwinkel, Ingeborg Hammann, Cologne, and Günter Unterstenhöfer, Opladen, Germany, assignors to Farbenfabriken Bayer Aktiengesellschaft, Leverkusen, Germany, a corporation of Germany
No Drawing. Filed July 12, 1968, Ser. No. 744,330
Claims priority, application Germany, Aug. 2, 1967, F 53,125
Int. Cl. C07d 27/18
U.S. Cl. 260—326.5        10 Claims

ABSTRACT OF THE DISCLOSURE (Alkyl, amino and O - alkyl) - O - alkyl-S-(maleic-imido methyl) - thiol and thionothiol) - (phosphoric and phosphonic)-acid esters which possess pesticidal, especially acaricidal and insecticidal, properties and which may be produced by reacting the corresponding thiol-phosphoric (phosphonic) and thionothiol - phosphoric (-phosphonic) acid ester in the presence of an acid-binding agent, or the corresponding alkali metal or ammonium salt, with N-halomethyl-maleic acid amide.

---

The present invention relates to and has for its objects the provision for particular new (thiono)thiol-phosphoric and (thiono)thiol - phosphonic acid esters of N-methyl maleic acid imide which possess pesticidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

The preparation of thiophosphoric acid esters by reaction of compounds of the general formula

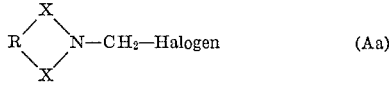

(Aa)

with salts of dialkyl-, -thio- or -thionothiol-phosphoric acids in an inert solvent at elevated temperature is already known from German Pat. 930,446. In the aforesaid formula, X stands for —CO— or SO$_2$— and R denotes an organic radical of the aliphatic, aromatic or heterocyclic series, for example a fused benzene ring. According to the particulars given in the above German patent, these products possess a good insecticidal activity.

It has been found in accordance with the present invention that the particular new thio-phosphorus acid esters, i.e. (thiono)thiol - phosphoric and (thiono)thiol - phosphonic acid esters, of N - methyl - maleic acid imide, e.g. (alkyl, amino and O - alkyl) - O - alkyl-S-(maleic-imido methyl) - (thiol and thionothiol) - (phosphoric and phosphonic)-acid esters, having the formula

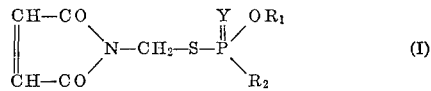

(I)

in which R$_1$ is lower alkyl, R$_2$ is selected from the group consisting of lower alkyl, lower alkoxy and amino, and Y is selected from the group consisting of oxygen and sulfur, exhibit strong pesticidal, especially insecticidal and acaricidal, properties.

It has been furthermore found in accordance with the present invention that a versatile and smooth process for the production of the particular new thiol and thionothiol phosphoric and phosphonic acid esters of N-methyl-maleic acid imides of Formula I above in favorable yields may be provided, which comprises reacting N-halomethyl-maleic acid amide having the formula

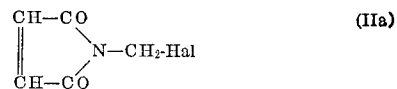

(IIa)

in which Hal is halo such as chloro, with the corresponding phosphoric, phosphonic or thiono-phosphoric (-phosphonic)-thiolacid ester having the formula

(IIb)

in which R$_1$, R$_2$ and Y are the same as defined above, in the presence of an acid-binding agent or in the form of the corresponding metal salts, e.g. alkali metal salts, or ammonium salts.

The particular new compounds of the general Formula I above are distinguished by outstanding insecticidal and acaricidal properties. These compounds possess an excellent activity against eating as well as sucking insects and a very good effectiveness against spider mites and ticks. In this respect, the particular new compounds which can be prepared according to the invention are clearly superior to the above-mentioned known products of analogous constitution; the former therefore represent a genuine enrichment of the art.

The course of the process for producing the particular new compounds according to the present invention is illustrated by the following typical reaction equation:

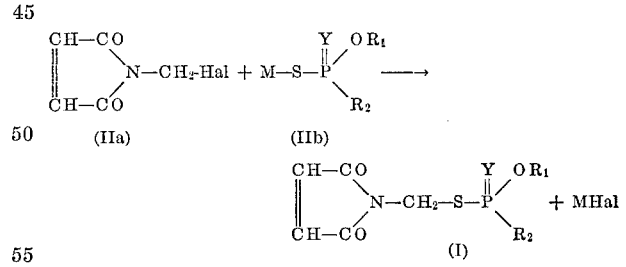

In the aforesaid equation, the symbols R$_1$, R$_2$, Y and Hal are the same as defined above and M is a metal (such as Na, K, etc.) or ammonium ion.

The N-halomethylmaleic acid imides of Formula IIa above which are required as starting materials for the instant reaction, in particular the appropriate chlorine compound, are already known from the literature (see P. O. Tawney, R. H. Snyder, R. P. Conger, K. A. Leibrand, C. H. Stiteler and A. R. Williams, Journal of Organic Chemistry, vol. 26, (1961), pages 15 to 21). These starting imides can even be prepared on an industrial scale.

As already mentioned, the (thiono)thiolphosphoric (-phosphonic) acid reactants of Formula IIb above may be used in the form of their salts. Instead of working with the salts, however, it is also possible to carry out the reaction in the presence of acid-binding agents. For this purpose, practically all customary acid acceptors can be used. There proved particularly suitable alkali metal alcoholates and carbonates, such as sodium and potassium methylate or ethylate as well as potassium and sodium carbonate as well as tertiary aliphatic, aromatic or heterocyclic amines, for example triethyl amine, dimethyl aniline, dimethylbenzyl amine or pyridine.

The process of the present invention is preferably carried out with the concurrent use of suitable solvents and diluents. As such, practically all inert organic solvents or mixtures thereof are suitable, such as hydrocarbons, for example benzine, benzene, toluene, chlorobenzene, xylene and/or ethers, for example diethyl and dibutyl ether or dioxan.

For the said purpose, however, particularly good results have been obtained with low-boiling aliphatic ketones, for example acetone, methylethyl ketone, methylisopropyl ketone and methylisobutyl ketone; alcohols, for example methanol, ethanol, propanol, and nitriles, such as acetonitrile and propionitrile; and furthermore, water and dimethyl formamide.

When carrying out the reaction of the present invention, the reaction temperature can be varied within a fairly wide range. In general, the work is carried out at substantially between about 10 to 80° C. (or the boiling point of the mixture), preferably at between about 20 to 60° C. The starting materials, as well as any auxiliary materials (e.g. acid-binding agents) are, in general, used in equimolar amounts.

After combining the starting components, it is advantageous, in order to complete the reaction, to continue heating the mixture for a longer period (e.g. about 1 to 3 hours), optionally with stirring. With this method of working, the products are obtained with outstanding yields as well as in excellent purity.

Some of the particular new (thiono)thiolphosphoric or (thiono)thiophosphonic acid esters of N-methyl-maleic acid imide which can be prepared according to the present invention are obtained as colorless crystalline compounds with sharp melting points, which can, if desired, readily be purified by recrystallization from the usual solvents; in some cases, the products are also obtained in the form of colorless or yellow to light-brown colored, viscous, water-insoluble oils which cannot be distilled without decomposition, but which can be freed from the last volatile components by so-called slight distillation, that is longer heating to moderately elevated temperatures under reduced pressure, and in this way be purified. For their more precise characterization, the determination of the refractive index can be used.

As already mentioned above, the particular new compounds of the present invention are distinguished by outstanding insecticidal and acaricidal effectiveness. They possess at the same time only a slight toxicity to warm-blooded animals and concomitantly slight phytotoxicity. The action sets in rapidly and is long-lasting. For this reason, the instant compounds can be used with very good success in plant protection endeavors for the control of noxious sucking and eating insects and Diptera as well as in the veterinary-medical field against mites (Acarina). The excellent effectiveness of the instant products against phosphoric acid ester resistant strains of spider mites is to be particularly emphasized.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*) such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnium prolixus*) and Chagas' bug (*Triatoma infestans*) and, further, cicadas, such as *Euscelis bilobatus* and *Nephottetix bipunctatus;* and the like.

Examples of typical biting insects contemplated herein are butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kuhniella*) and greater wax moth (*Galleria mellonella*); and the like.

Also to be classed with the biting insects contemplated herein are beetles (Coleoptera), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil, (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), but also species living in the soil, for example wireworms (*Agriotes* spec.) and larvae of the cockchafer (*Melolontha melolontha*); cockroaches, such as the German cockroach (*Blatella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephalo*), as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-Panonychus ulmi*), the blister mites, for example the current blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When used against hygiene pests and pests of stored products, particularly flies and gnats, the instant compounds are also distinguished by an outstanding residual activity on wood and clay as well as a good stability to alkali on limed substrates.

The active compounds according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, including inert organic solvents such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001 and 20%, preferably 0.01–5%, by weight of the mixture. Thus, the present invention contemplates over-all compositions which comprise mixtures of a dispersible carrier vehicle such as (1) a dispersible carrier solid, and/or (2) a dispersible carrier liquid such as an inert organic solvent and/or water preferably including a carrier vehicle assistant, e.g. surface-active agent, such as an emulsifying agent, i.e. anionic and/or nonionic emulsifying agents, and/or a dispersing agent, and an amount of the active compound which is effective for the purpose in question and which is generally between about 0.00001 and 95%, and preferably 0.01–95% by weight of the mixture.

The active compounds can also be used in accordance with the well known ultra-low-volume process with good success, i.e. by applying such compound if normally a liquid, or by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95%, by weight of active compound or even the 100% active substance alone, e.g. about 40–100%, by weight of the active compound.

In particular, the present invention contemplates methods of selectively controlling or combating pests, e.g. arthropods, i.e. insects and acarids, and more particularly, methods of combating at least one of insects and acarids which comprises applying to at least one of corresponding (a) such insects, (b) such acarids, and (c) the corresponding habitat, i.e. the locus to be protected, a correspondingly combative amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

Surprisingly, the instant new compounds are distinguished from the active compounds of analogous constitution and the same type of activity known from the literature by a much better effectiveness with considerably lower toxicity to warm-blooded animals. The instant compounds therefore represent a genuine enrichment of the art.

The unexpected superiority as well as the outstanding activity of the particular new compounds at the present invention when used against a multiplicity of pests and animal parasites is illustrated without limitation by the followng examples:

EXAMPLE 1

Doralis test (systemic action)

Solvent: 3 parts by weight acetone
Emulsifier: 1 part by weight alkylaryl polyglycol ether To produce a suitable preparation of the particular active compound, 1 part by weight of such active compound is mixed with the started amount of solvent containing the stated amount of emulsifier, and the resulting concentrate is diluted with water to the desired final concentration.

Bean plants (*Vicia faba*) which are heavily infested with the bean aphid (*Doralis fabae*) are watered with the active compound preparation in such a manner that the active compound preparation penetrates into the soil without wetting the leaves of the bean plants. The active compound is taken up by the bean plants from the soil and in this way reaches the infested leaves.

After the specified period of time, the degree of destruction is determined as a percentage. 100% means that all the aphids were killed, 0% means that none of the aphids were killed.

The particular active compounds tested, their concentrations, the evaluation time and the results obtained can be seen from the following Table 1:

TABLE 1

| Active compound (constitution) | Concentration of active compound in percent | Degree of destruction in percent after 4 days |
|---|---|---|
| (A) $(CH_3O)_2\overset{S}{\overset{\parallel}{P}}-S-CH_2-N\begin{smallmatrix}CO\\ \\CO\end{smallmatrix}\hspace{-2pt}\diagup\hspace{-8pt}\diagdown\hspace{-2pt}\bigcirc$ (Comparative preparation known from German patent 930,446) | 0.1 | 0 |
| (III$_1$) $(CH_3O)_2\overset{S}{\overset{\parallel}{P}}-S-CH_2-N\begin{smallmatrix}CO-CH\\ \parallel\\CO-CH\end{smallmatrix}$ | 0.1<br>0.02<br>0.004 | 100<br>100<br>90 |

EXAMPLE 2

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the active compound preparation until dripping wet. These bean plants are heavily infested with spider mites (*Tetranychus urticae*) in all stages of development.

After the specified period of time, the effectiveness of the active compound preparation is determined by counting the dead mites. The degree of destruction thus obtained is expressed as a percentage: 100% means that all the spider mites are killed whereas 0% means that none of the spider mites are killed.

The particular active compounds tested, their concentrations, the evaluation time and the results obtained can be seen from the following Table 2:

acid. The temperature or the mixture increases gradually from 15° C. to 30° C. After subsequent stirring for one hour, the reaction mixture is poured into water and the separated oil is taken up in benzene. The benzene solution is washed several times with water and dried over sodium sulfate. After the solvent has been distilled off, there remain behind 75 g. (65.2% of the theory) of O,O-dimethyl-S-maleic-imido methyl)-thionothiol-phosphoric acid ester in the form of a pale-yellow oil which, when rubbed with petroleum ether, rapidly solidifies to crystalline form and then melts at 46 to 48° C.

*Analysis.*—Calculated for a molecular weight of 267.3 (percent): N, 5.24; S, 23.99; P, 11.59. Found (percent): N, 5.22; S, 23.75; P, 11.63.

(b) 145 g. (1 mol) N-chloromethyl-maleic acid imide is added to 20° C. to 564 cc. (1.2 mol) of an aqueous solution of the sodium salt of O,O-dimethyl-thionothiol-phosphoric acid (38.3%). The reaction is slightly exothermic and is taken to completion by heating the mixture to 45 to 50° C. for one hour. The separated oil solidifies to crystalline form during cooling. The crystal mass is filtered off with suction, washed with water, and colorless crystals of melting point 51 to 53° C. are obtained. The yield is 240 g. (90% of the theory) of said O,O-dimethyl - S - (maleic - imido methyl) - thionothiol - phosphoric acid ester.

TABLE 2

| Active compound (constitution) | Concentration of active compound in percent | Degree of destruction in percent after 48 hours |
|---|---|---|
| (A) $(CH_3O)_2\overset{S}{\overset{\parallel}{P}}-S-CH_2-N\begin{smallmatrix}CO\\ \\CO\end{smallmatrix}\hspace{-2pt}\diagup\hspace{-8pt}\diagdown\hspace{-2pt}\bigcirc$ (Comparative preparation known from German patent 930,446) | 0.1 | 0 |
| (III$_2$) $(CH_3O)_2\overset{S}{\overset{\parallel}{P}}-S-CH_2-N\begin{smallmatrix}CO-CH\\ \parallel\\CO-CH\end{smallmatrix}$ | 0.1<br>0.02 | 100<br>95 |

The following further examples illustrate without limitation the process for producing the particular new compounds according to the present invention:

EXAMPLE 3

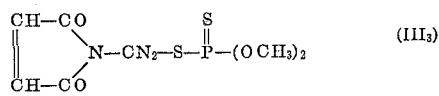

Into a solution of 58 g. N-chloromethyl-maleic acid imide (prepared according to P. O. Tawney and co-workers, J. Org. Chem. vol. 26, page 20, 1961) in 250 ml. acetone there are introduced 84 g. (0.48 mol) of the ammonium salt of O,O-dimethylthionothiol-phosphoric The median toxicity of the compound in the rat per os is 250 mg./kg.

EXAMPLE 4

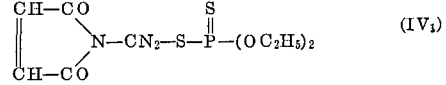

58 g. (0.4 mol) N-chloromethyl-maleic acid imide are dissolved in 250 cc. acetone. Into this solution are introduced, commencing at 20° C., 100 g. (0.48 mol) of the ammonium salt of O,O-diethyl-thionothiol-phosphoric acid. The temperature of the reaction mixture rises slowly to 39 to 40° C. After the mixture has been stirred for one hour, during which it cools, water is added to it and the separated oil is taken up in benzene. The benzene solution is washed with water, dried over sodium sulfate, and the solvent is distilled off. 102 g. (86.5% of the theory) of O,O-diethyl-S-maleic-imido methyl)-thionothiol-phosphoric acid ester are obtained as light-brown, viscous oil with the refractive index $n_D^{21}=1.4555$.

*Analysis.*—Calculated for a molecular weight of 295.3 (percent): N, 4.74; S, 21.72; P, 10.49. Found (percent): N, 4.24; S, 21.80; P, 10.91.

EXAMPLE 5

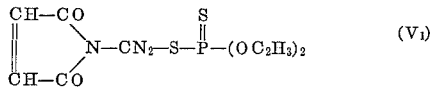

A mixture of 58 g. (0.4 mol) N-chloromethyl-maleic acid imide and 90 g. (0.4 mol) of the ammonium salt of O,O-diethylthiol-phosphoric acid in 250 cc. acetone is heated to 50 to 60° C. Ammonium chloride precipitates after only a short time. When the mixture has cooled, the precipitate is filtered off with suction and the solvent is removed from the filtrate by distillation under reduced pressure. 200 cc. of water are added to the oily residue and the aqueous solution is adjusted to a pH value of 7 to 7.5 with potassium carbonate. The reaction mixture is repeatedly extracted with methylene chloride and the methylene chloride solution is dried over sodium sulfate. After the solvent is distilled off there remain behind 98 g. (88% of the theory) of O,O-diethyl-S-maleic-imido methyl)-thiol-phosphoric acid ester as brownish, somewhat viscous oil with the refractive index $n_D^{21}=1.5120$.

*Analysis.*—Calculated for a molecular weight of 279.3 (percent): N, 5.02; S, 11.48; P, 11.09. Found (percent): N, 4.78; S, 11.20; P, 11.02.

EXAMPLE 6

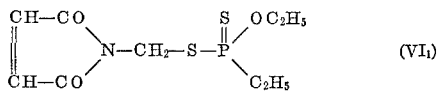

58 g. (0.4 mol) N-chloromethyl-maleic acid imide are dissolved in 250 cc. acetone. After the introduction of 100 g. (0.48 mol) of the potassium salt of ethyl-O-ethyl-thionothiol-phosphonic acid, the temperature of the mixture rises slowly to 40° C. without external supply of heat. This temperature is maintained by occasionally cooling the reaction mixture. After stirring for one hour at room temperature the mixture is poured into water, and the separated oil is taken up in benzene. The benzene solution is washed several times with water, dried over sodium sulfate, the solvent is distilled off and ethyl-thionothiol-phosphonic acid O-ethyl-S-(maleic-imido methyl) ester is obtained in the form of a light-brown, viscous oil with the refractive index $n_D^{21}=1.4714$. The yield is 59 g. (52.8% of the theory).

*Analysis.*—Calculated for a molecular weight of 279.3 (percent): N, 5.02; S, 22.96; P, 11.09. Found (percent): N, 5.00; S, 23.01; P, 11.32.

EXAMPLE 7

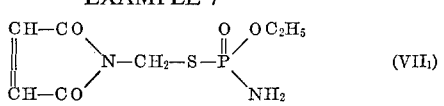

Into a solution of 90 g. (0.55 mol) of the potassium salt of amido-O-ethyl-thiol-phosphoric acid in 300 cc. of water there are introduced 72.5 g. (0.5 mol) N-chloromethyl-maleic acid imide. After the mixture has been heated for one hour to 40 to 50° C. it is allowed to cool, the reaction product is salted out with sodium sulfate and extracted from the aqueous solution by repeated shaking out with methylene chloride. The organic phase is dried over sodium sulfate and worked up in the manner described in the preceding examples. There are so obtained 93 g. (74.4% of the theory) of amino-thiol-phosphoric acid O-ethyl-S-(maleic-imido methyl) ester as greenish-yellow oil of refractive index $n_D^{21}=1.5338$.

*Analysis.*—Calculated for a molecular weight of 250.2 (percent): N, 11.20; S, 12.41; P, 12.38. Found (percent): N, 11.15; S, 12.47; P, 12.39.

The median toxicity ($DL_{50}$) of the compound in the rat per os is 100 to 250 mg./kg.

Advantageously, in accordance with the present invention, in the foregoing formulae:

$R_1$ represents straight and branched chain lower alkyl such as methyl to tert.-butyl inclusive, especially methyl, ethyl, n- and iso-propyl, n-, iso- and s-butyl, and the like, and more particularly alkyl having 1–4 carbon atoms, preferably $C_{1-2}$ alkyl and more preferably methyl;

$R_2$ represents straight and branched chain lower alkyl as defined above for $R_1$, and more particularly alkyl having 1–4 carbon atoms, preferably $C_{1-2}$ alkyl and more preferably ethyl, $R_2$ and $R_1$ being the same or different where $R_1$ is also lower alkyl; or straight and branched chain lower alkoxy such as methoxy to tert.-butoxy inclusive, especially methoxy, ethoxy, n- and iso-propoxy, n-, iso- and s-butoxy, and the like, and more particularly alkoxy having 1–4 carbon atoms, preferably $C_{1-2}$ alkoxy and more preferably methoxy; or amino; and Y represents oxygen or sulfur.

Preferably, $R_1$ is lower alkyl, most preferably $C_{1-4}$ or $C_{1-2}$ alkyl; $R_2$ is lower alkoxy, most preferably $C_{1-4}$ or $C_{1-2}$ alkoxy; and Y is oxygen or sulfur, most preferably sulfur. In particular, $R_1$ is methyl or ethyl; $R_2$ is methoxy or ethoxy; and Y is oxygen or sulfur, especially sulfur.

The instant compounds particularly contemplate O,O-dilower alkyl-S-(maleic-imido methyl)-(thiol and thionothiol)-phosphoric acid esters.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, i.e. both in the specification and claims, the terms "anthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodically effective amount which in effect means an insecticidally or acardicidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Thio-phosphorus-acid ester of N-methyl-maleic acid imide having the formula

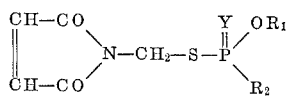

in which $R_1$ is lower alkyl, $R_2$ is selected from the group consisting of lower alkyl, lower alkoxy and amino, and Y is selected from the group consisting of oxygen and sulfur.

2. Ester according to claim 1 wherein $R_1$ is $C_{1-4}$ alkyl, $R_2$ is selected from the group consisting of $C_{1-4}$ alkyl, $C_{1-4}$ alkoxy and amino, and Y is selected from the group consisting of oxygen and sulfur.

3. Ester according to claim 1 wherein $R_1$ is lower alkyl, $R_2$ is lower alkoxy, and Y is selected from the group consisting of oxygen and sulfur.

4. Ester according to claim 1 wherein $R_1$ is lower alkyl, $R_2$ is lower alkyl, and Y is selected from the group consisting of oxygen and sulfur.

5. Ester according to claim 1 wherein $R_1$ is $C_{1-4}$ alkyl, $R_2$ is $C_{1-4}$ alkoxy, and Y is sulfur.

6. Ester according to claim 1 wherein such compound is O,O-dimethyl-S-(maleic-imido methyl)-thionothiol-phosphoric acid ester having the formula

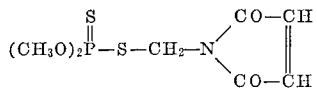

7. Ester according to claim 1 wherein such compound is O,O-diethyl-S-(maleic-imido methyl)-thionothiol-phosphoric acid ester having the formula

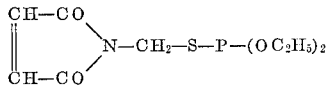

8. Ester according to claim 1 wherein such compound is O,O-diethyl-S-(maleic-imido methyl)-thiol-phosphoric acid ester having the formula

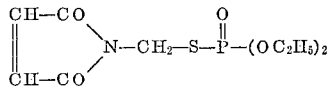

9. Ester according to claim 1 wherein such compound is ethyl-O-ethyl-S-(maleic-imido methyl)-thionothiol-phosphonic acid ester having the formula

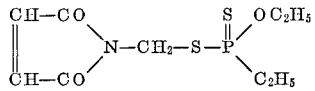

10. Ester according to claim 1 wherein such compound is amino-O-ethyl-S-(maleic-imido methyl)-thiol-phosphoric acid ester having the formula

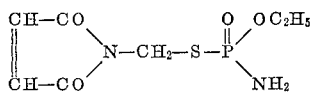

References Cited

UNITED STATES PATENTS 3,450,713  6/1969  Tolkmith et al. ___ 260—326. A

ALEX MAZEL, Primary Examiner

J. A. NARCAVAGE, Assistant Examiner

U.S. Cl. X.R.

424—200

UNITED STATES PATENT OFFICE
CERTIFICATE OF CORRECTION

Patent No. 3547946          Dated December 15, 1970

Inventor(s) Walter Lorenz, Ingeborg Hammann & Gunter Unterstenl

It is certified that error appears in the above-identified patent and that said Letters Patent are hereby corrected as shown below:

Col. 3, line 18, "slovents" should be -- solvents --

Col. 6, line 60, "started" should be -- stated --

Col. 7, line 69, Example 3

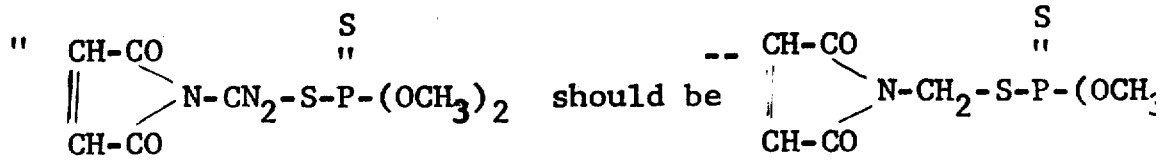

Col. 8, first formula, Example 4

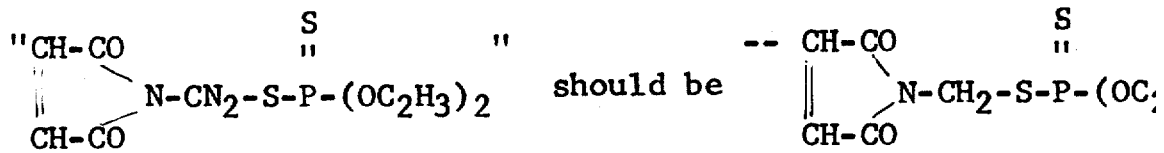

Col. 9, first formula, Example 5

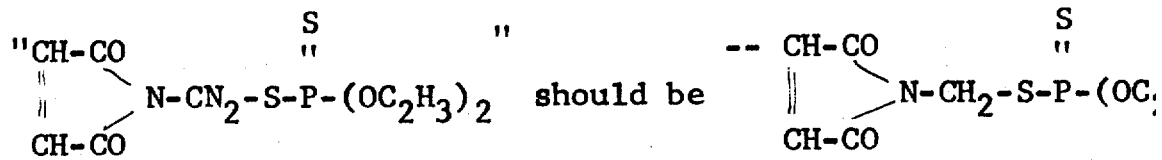

Col. 10, line 42, "anthropod" should be -- arthropod --

Signed and sealed this 6th day of July 1971.

(SEAL)
Attest:

EDWARD M. FLETCHER, JR.          WILLIAM E. SCHUYLER, JR.
Attesting Officer                Commissioner of Patents